| United States Patent [19] | [11] Patent Number: 4,882,380 |
| Ficker et al. | [45] Date of Patent: Nov. 21, 1989 |

[54] PROCESS FOR THE PRODUCTION OF IMPACT POLYPROPYLENE COPOLYMERS

[75] Inventors: Harold K. Ficker, Wayne, N.J.; William G. Sheard, South Charleston, W. Va.

[73] Assignee: Union Carbide Chemicals and Plastics Company Inc., Danbury, Conn.

[21] Appl. No.: 70,573

[22] Filed: Jul. 7, 1987

[51] Int. Cl.$^4$ ............................................. C08F 297/08
[52] U.S. Cl. ..................................... 525/53; 525/268; 525/270; 525/323; 525/267
[58] Field of Search ................. 525/53, 323, 268, 247, 525/270

[56] References Cited

U.S. PATENT DOCUMENTS

| 3,629,368 | 12/1971 | Fukuda et al. | 525/323 |
| 4,284,738 | 8/1981 | Zukowski | 525/53 |
| 4,337,326 | 6/1982 | Shiga et al. | 525/244 |
| 4,454,299 | 6/1984 | Schweier et al. | 525/53 |
| 4,520,163 | 5/1985 | Goodall | 525/53 |
| 4,582,878 | 4/1986 | Chiba et al. | 525/268 |
| 4,740,551 | 4/1988 | Foster | 525/323 |
| 4,820,775 | 4/1989 | Shiga et al. | 525/323 |

*Primary Examiner*—Wilbert J. Briggs, Sr.
*Attorney, Agent, or Firm*—Saul R. Bresch

[57] ABSTRACT

A process for the production of a product comprising ethylene/propylene copolymer incorporated into a matrix of propylene homopolymer or copolymer comprising the following steps:

(a) contacting propylene or propylene and at least one alpha-olefin having 2 to 8 carbon atoms, and hydrogen, wherein the alpha-olefin is present in a ratio of about 0.01 to about 0.06 mole of alpha-olefin per mole of propylene and the hydrogen is present in a ratio of about 0.001 to about 0.45 mole of hydrogen per mole of combined propylene and alpha-olefin, with a catalyst comprising (i) a catalyst precursor, which includes titanium, magnesium, chlorine, and an electron donor; (ii) a hydrocarbylaluminum cocatalyst; and (iii) a selectivity control agent, which is different from the electron donor, in a first reactor in such a manner that a mixture of a homopolymer of propylene or a copolymer of propylene and alpha-olefin together with active catalyst is produced;

(b) passing the mixture from step (a) into a second reactor; and (c) adding to the second reactor:
  (i) a sufficient amount of ethylene and propylene to provide ethylene/propylene copolymer in an amount of about 20 percent to about 45 percent by weight, based on the weight of the product, said ethylene and propylene being introduced in a ratio of about 10 to about 100 moles of ethylene per mole of propylene; and
  (ii) hydrogen in a mole ratio of about 0.1 to about 1.0 mole of hydrogen per mole of combined ethylene and propylene; and (d) effecting the copolymerization of ethylene and propylene in the second reactor in such a manner that the product is produced.

12 Claims, No Drawings

PROCESS FOR THE PRODUCTION OF IMPACT POLYPROPYLENE COPOLYMERS

TECHNICAL FIELD

This invention relates to a process for the production of impact polypropylene copolymers.

BACKGROUND ART

Polypropylene homopolymers are widely used for many consumer and industrial applications where high impact strength at low temperature is not required. For applications requiring a high level of low temperature impact strength, so-called "impact polypropylene copolymers" are used. These polypropylene copolymers are usually manufactured by the incorporation of an elastomeric impact modifier, e.g., an ethylene/propylene copolymer rubber (EPR), into a homopolymer matrix either by blending the homopolymer with the EPR or by producing the copolymer in situ. Impact copolymers generally have excellent low temperature properties, but suffer from a deficiency known as "stress whitening" or "blushing". This phenomenon occurs when a molded impact copolymer is stressed or impacted, and results in a white mark on the surface of the molded copolymer at the point of impact. These white marks are obviously undesirable in such consumer items as housewares, appliances, and automotive interiors. To overcome this deficiency and produce a stress whitening resistant product, a three reactor process was proposed. It would be economically desirable, however, to accomplish the same result in two reactors.

DISCLOSURE OF THE INVENTION

An object of this invention, therefore, is to provide a process for the production of an impact polypropylene copolymer with desirable low temperature properties together with a high level of stress whitening resistance in two reactors.

Other objects and advantages will become apparent hereinafter.

According to the present invention, the above object is met by a process for the production of a product comprising ethylene/propylene copolymer incorporated into a matrix of propylene homopolymer or copolymer comprising the following steps:

(a) contacting propylene or propylene and at least one alpha-olefin having 2 to 8 carbon atoms, and hydrogen, wherein the alpha olefin is present in a ratio of about 0.01 to about 0.06 mole of alpha-olefin per mole of propylene and the hydrogen is present in a ratio of about 0.001 to about 0.45 mole of hydrogen per mole of combined propylene and alpha-olefin, with a catalyst comprising (i) a catalyst precursor, which includes titanium, magnesium, chlorine, and an electron donor; (ii) a hydrocarbylaluminum cocatalyst; and (iii) a selectivity control agent, which is different from the electron donor, in a first reactor in such a manner that a mixture of a homopolymer of propylene or a copolymer of propylene and alpha olefin together with active catalyst is produced;

(b) passing the mixture from step (a) into a second reactor; and (c) adding to the second reactor:

(i) a sufficient amount of ethylene and propylene to provide ethylene/propylene copolymer in an amount of about 20 percent to about 45 percent by weight, based on the weight of the product, said ethylene and propylene being introduced in a ratio of about 10 to about 100 moles of ethylene per mole of propylene; and (ii) hydrogen in a mole ratio of about 0.1 to about 1.0 mole of hydrogen per mole of combined ethylene and propylene; and d) effecting the copolymerization of ethylene and propylene in the second reactor in such a manner that the product is produced.

DETAILED DESCRIPTION

Except as noted above, the process steps and conditions and the catalyst used in each reactor can be the same as those described in U.S. Pat. No. 4,414,132, issued on Nov. 8, 1983 or U.S. patent application Ser. No. 051,853 filed on May 19, 1987, and the reactors are preferably gas phase reactors such as the fluidized bed reactor described in U.S. Pat. No. 4,482,687, issued on Nov. 13, 1984. The aforementioned patents and application are incorporated by reference herein.

A typical catalyst is made up of a catalyst precursor, which includes magnesium, titanium, chlorine, and an electron donor; an organoaluminum compound, which can be referred to as a cocatalyst; and a selectivity control agent. The selectivity control agent is defined as an additive, which modifies the catalyst precursor in such a manner as to increase the overall percentage of isotactic crystalline polymer produced.

The catalyst precursor can be obtained by halogenating a magnesium compound having the formula $MgR_{2-n}X_n$ wherein R is an alkoxide, aryloxide, or carboxylate group, each R being alike or different, X is a halogen, and n=0 or 1 with a tetravalent titanium halide in the presence of a halohydrocarbon and an electron donor; contacting the halogenated product with a tetravalent titanium halide; optionally treating the resulting solid with an aromatic acid chloride; washing the halogenated product to remove unreacted titanium compounds; and recovering the solid product.

The atomic or mole ratios of catalyst components are generally as follows:

| Ratio | Broad Range | Preferred Range |
| --- | --- | --- |
| Mg to Ti | 1:1 to 50:1 | 3:1 to 30:1 |
| Cl to Mg | 1:1 to 5:1 | 2:1 to 3:1 |
| Mg to electron donor | 0.1:1 to 100:1 | 1:1 to 60:1 |
| Cocatalyst to Ti | 5:1 to 300:1 | 20:1 to 100:1 |
| Cocatalyst to selectivity control agent | 0.1:1 to 100:1 | 0.2:1 to 50:1 |

Suitable halogen containing magnesium compounds that can be used to prepare the catalyst precursor are alkoxy and aryloxy magnesium halides such as isobutoxy magnesium chloride, ethoxy magnesium bromide, phenoxy magnesium iodide, cumyloxy magnesium bromide, and naphthenoxy magnesium chloride.

Magnesium compounds which can be used are magnesium dialkoxides, diaryloxides, and carboxylates having 2 to 24 carbon atoms such as magnesium di-isopropoxide, magnesium diethoxide, magnesium dibutoxide, magnesium diphenoxide, magnesium dinaphthenoxide, and ethoxy magnesium isobutoxide, magnesium dioctanoate, and magnesium dipropionate.

Magnesium compounds having one alkoxide and aryloxide group can also be employed. Examples of such compounds are ethoxy magnesium phenoxide and napthenoxide magnesium isoamyloxide. Also suitable are compounds having one carboxylate group and one alkoxide, aryloxide, or halide group such as ethoxy magnesium octanoate, phenoxy magnesium propionate, and chloromagnesium dodecanoate.

Suitable halides of tetravalent titanium include aryloxy- or alkoxy di- and -trihalides, such as dihexoxy titanium dichloride, diethoxy titanium dibromide, isopropoxy titanium triiodide, and phenoxy titanium trichloride; titanium tetrahalides, such as titanium tetrachloride, are preferred.

The halohydrocarbons employed can be aromatic or aliphatic. Each aliphatic halohydrocarbon preferably contains from 1 to 12 carbon atoms and at least 2 halogen atoms. The aliphatic halohydrocarbons include dibromomethane, trichloromethane, 1,2-dichloroethane, dichlorobutane, 1,1,3-trichloroethane, trichlorocyclohexane, dichlorofluoroethane, trichloropropane, trichlorofluorooctane, dibromodifluorodecane, hexachloroethane, and tetrachloroisooctane. Carbon tetrachloride and 1,1,3-trichloroethane are preferred. Aliphatic halohydrocarbons containing only one halogen atom per molecule such as butyl chloride and amyl chloride, can also be employed. Suitable aromatic halohydrocarbons include chlorobenzene, bromobenzene, dichlorobenzene, dichlorodi bromobenzene, naphthyl chloride, clorotoluene, and dichlorotoluene. Chlorobenzene is the most preferred halohydrocarbon.

Suitable electron donors, which can be used in the Mg/Ti complex (as an inner donor) or as a selectivity control agent (as an outer donor) separately or complexed with the organoaluminum compound, are ethers, mono- or polycarboxylic acid esters, ketones, phenols, amines, amides, imines, nitriles, silanes, -phosphines, phosphites, stilbenes, arsines, phosphoramides, and alcoholates. It is understood, however, that the selectivity control agent (the outer donor) must be different from the electron donor, i.e., the inner donor.

Examples are esters of carboxylic acids such as ethyl and methyl benzoate, p-methoxy ethyl benzoate, p-ethoxy methyl benzoate, p-ethoxy ethyl benzoate, ethyl acrylate, methyl methacrylate, ethyl acetate, p-chloro ethyl benzoate, p-amino hexyl benzoate, isopropyl naphthenate, n-amyl toluate, ethyl cyclohexanoate, and propyl pivalate. Examples of amines are N,N,N',N'-tetramethylethylene diamine, 1,2,4-trimethyl piperazine, and 2,2,6,6-tetramethyl piperidine.

The preferred electron donor for use in preparing the catalyst precursor (the inner donor) is ethyl benzoate. The preferred electron donor for use as a selectivity control agent (the outer donor) is para ethoxy ethyl benzoate.

Another preferred combination of inner donor and outer donor follows:

(i) inner donor=a polycarboxylic acid ester containing two coplanar ester groups attached to adjacent carbon atoms; and (ii) outer donor=a silicon compound containing a silicon oxygen carbon linkage wherein the atomic ratio of aluminum in the hydrocarbyl aluminum cocatalyst to silicon in the silicon compound is in the range of about 0.5:1 to about 100:1 and the atomic ratio of said aluminum to the titanium in the catalyst precursor is in the range of about 5:1 to about 300:1.

The polycarboyxlic acid ester is characterized by a molecularly rigid structure wherein two ester groups are attached to adjacent carbon atoms of the molecule and lie in a single plane. Such esters include: (a) polycarboxylic acid esters containing two ester groups which are attached to ortho carbon atoms of a monocycli or polycyclic aromatic ring, each of said ester groups being further linked to a branched or unbranched chain hydrocarbon radical; (b) polycarboxylic acid esters containing two ester groups which are attached to vicinal carbon atoms of a non-aromatic monocyclic or polycyclic ring and which lie in a syn configuration with respect to each other, each of said ester groups being further linked to a branched or unbranched chain hydrocarbon radical; and (c) polycarboxylic acid esters containing two ester groups which are attached to vicinal double bonded carbon atoms of an unsaturated aliphatic compound and which lie in a syn configuration with respect to each other, each of said ester groups being further linked to a branched or unbranched chain hydrocarbon radical.

Among the polycarboxylic acid esters which can be employed as inner electron donors are dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, di-2-ethyldecyl phthalate, diethyl-1,2-fluorenedicarboxylate, diisopropyl-1,2-ferrocenedicarboxylate, cis-diisobutyl-cyclobutane-1,2-dicarboxylate, endo-diisobutyl-5-norbornene-2,3-dicarboxylate and endo-diisobutyl-bicyclo[2.2.2]oct-5-ene-2,3-dicarboxylate, diisobutyl maleate, and diisoamyl citraconate. Diisobutyl phthalate is most preferred.

The silicon compounds employed as selectivity control agent or outer electron donor in the catalyst system employed in the process of the invention contains at least one silicon oxygen carbon linkage. Suitable silicon compounds include compounds having the formula

wherein:

R is a hydrocarbon radical having 1 to 20 carbon atoms,

Y is —OR' or —OCOR' wherein R' is a hydrocarbon radical having 1 to 20 carbon atoms, X is hydrogen or halogen, m is an integer having a value of 0 to 3, n is an integer having a value of 1 to 4, p is an integer having a value of 0 or 1, and m+n+p is equal to 4.

Each of R and R' can be the same or different, and, if desired, substituted with any substituent which is inert under the reaction conditions employed during polymerization. Preferably, R and R' contain from 1 to 10 carbon atoms when they are aliphatic or cycloaliphatic, and from 6 to 10 carbon atoms when they are aromatic.

Silicon compounds in which two or more silicon atoms are linked to each other by an oxygen atom may also be employed, provided the requisite silicon-oxygen-carbon linkage is also present.

The hydrocarbyl aluminum cocatalyst can be represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be alike or different; and each R, which is a hydrocarbyl radical, has 1 to 20 carbon atoms, and preferably 1 to 10 carbon atoms. Further, each alkyl radical can be straight or branched chain and such hydrocarbyl radical can be a mixed radical, i.e., the radical can contain alkyl, aryl, and/or cycloalkyl groups. Examples of suitable radicals are: methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, phenyl, phenethyl, methoxyphenyl, benzyl, tolyl, xylyl, naphthyl, naphthal, methylnaphthyl, cyclohexyl, cycloheptyl, and cyclooctyl.

Examples of suitable hydrocarbyl aluminum compounds are as follows: triisobutylaluminum, trihexylaluminum, di-isobutylaluminum hydride, dihexylaluminum hydride, isobutylaluminum dihydride, hexylaluminum dihydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthyaluminum, and tritolylaluminum. The preferred hydrocarbyl aluminums are triethylaluminum, triisobutylaluminum, trihexylaluminum, di-isobutylaluminum hydride, and dihexylaluminum hydride.

The acid halide mentioned above as optional is the derivative of the ester compound used as the inner electron donor. Preferably, the halide is a chloride or bromide. The acid halide can contain 7 to 22 carbon atoms and one or more aromatic rings.

The polymerization can be conducted using gas phase, slurry, or solution processes; however, the polymerization in the second reactor is preferably carried out in the gas phase. For gas phase polymerizations, fluidized bed reactors are the reactors of choice.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomers and, if desired, modifiers and/or an inert carrier gas.

The essential parts of the reaction system are the vessel, the bed, the gas distribution plate, inlet and outlet piping, a compressor, a cycle gas cooler, and a product discharge system. In the vessel, above the bed, there is a velocity reduction zone, and in the bed, a reaction zone. Both are above the gas distribution plate.

The fluidized bed reactors are operated at a temperature in the range of about 40° C. to about 150° C. and preferably about 60° C. to about 120° C. and a pressure of about 50 psig to about 700 psig and preferably about 250 psig to about 550 psig. The velocity of the fluidizing gas is in the range of about 0.1 to about 3.0 feet per second and preferably about 0.5 to about 2.0 feet per second. The weight flow ratio of monomer to catalyst in the first reactor is about 1000:1 to about 100,000:1 and is preferably about 10,000:1 to about 100,000:1.

Propylene or a mixture of propylene and at least one alpha-olefin having 2 to 8 carbon atoms is introduced together with hydrogen and catalyst into the first reactor. The alpha-olefin components can be, for example, ethylene, 1-butene, or 1-hexene, or various mixtures of alpha-olefin. The mole ratio of alpha olefin to propylene is about 0.01 to about 0.06 and, preferably, is about 0.015 to about 0.04. The mole ratio of hydrogen to propylene alone or combined propylene and alpha-olefin is in the range of about 0.001 to about 0.45 and is preferably about 0.004 to about 0.1.

The combination of components and conditions, previously mentioned, lead to a mixture of homopolymer or copolymer of propylene together with active catalyst embedded in the polymer matrix. This mixture from the first reactor is transferred to the second reactor to which additional catalyst, cocatalyst, and selectivity control agent can be added although it is preferred that only cocatalyst be added to the second reactor. For some catalysts, none of these three components need be added.

In the second reactor, etheylene and propylene are introduced in a mole ratio of about 10 to about 100 moles of ethylene per mole of propylene, and preferably about 10 to about 50 moles of ethylene per mole of propylene. The combined ethylene/propylene addition is sufficient to provide a copolymer fraction of about 20 to about 45 percent by weight of copolymer based on the weight of the product, and preferably a copolymer fraction of about 25 to about 30 percent by weight. As noted above, the product i.e., the final product, is an ethylene/propylene copolymer incorporated into a matrix of propylene homopolymer or copolymer. Hydrogen is also introduced into the second reactor together with the ethylene and propylene. The mole ratio of hydrogen to combined ethylene and propylene is about 0.1 to about 1.0 and is preferably about 0.1 to about 0.4. It should be noted that some or all of the propylene in the second reactor can come from the first reactor. The two reactors are operated continuously, in series.

The introduction of alpha-olefin comonomer into the first reactor results in final products with somewhat lower stiffness (flexural modulus), but with some gain in Izod impact strength.

Additional advantages of subject process are that the product is not sticky and does not foul the apparatus, and high melting points and stiffness are achieved.

The product produced by subject process is an impact polypropylene copolymer comprising (a) a polymer selected from the group consisting of a homopolymer of propylene and a random copolymer of propylene and at least one alpha-olefin having 2 to 8 carbon atoms wherein (i) the polymer is present in an amount of about 55 to about 80 percent by weight based on the weight of the impact polypropylene copolymer, and is preferably present in an amount of about 70 to about 75 percent by weight; and (ii) the portion of the random copolymer based on alpha-olefins other than propylene is not greater than about 7 percent by weight based on the weight of the random copolymer and is preferably about 1 to about 3 percent by weight; and (b) a copolymer of ethylene and propylene wherein (i) the copolymer is present in an amount of about 20 to about 45 percent by weight based on the weight of the impact polypropylene copolymer, and is preferably present in an amount of about 25 to about 30 percent by weight; and (ii) the portion of the copolymer based on ethylene is at least about 90 percent be weight based on the weight of the copolymer and is preferably at least about 95 percent by weight.

The impact polypropylene copolymer has the following physical properties:

(i) the Gardner Impact Strength is at least 80 inch pounds as measured by ASTM D3029, Condition G, at −30° C. on a ⅛ inch thick injection molded disc;

(ii) the DSC Melting Point attributable to the polyethylene crystalline fraction is in the range of about 125° C. to about 132° C. as measured by ASTM 3417; and (iii) the Heat of Fusion attributable to the polyethylene crystalline fraction is at least about 5 calories per gram of impact polypropylene copolymer as measured by ASTM 3418.

The invention is illustrated by the following examples:

EXAMPLES 1 to 5

To the first fluidized bed is charged liquid polypropylene and a prepared catalyst precursor having the following approximate composition: $TiCl_4°12\ MgCl_2°2\ C_6H_5COOC_2H_5$. The weight ratio of liquid polypropylene to catalyst precursor is 10 kilograms of propylene per gram of catalyst precursor. A cocatalyst, triethylaluminum, and a selectivity control agent, para-ethoxy ethyl benzoate, in a mole ratio of about 2:1, are fed into the reactor at the same time as the catalyst precursor. The atomic ratio of aluminum to titanium is about 60.

Conditions under which the first fluidized bed reactor is operated are approximately as follows:
temperature: 65° C. (except 80° C. in example 2)
pressure: 440 psia
fluidizing gas velocity: 1.0 foot per second The mixture from the first reactor is transferred to the second reactor and the additions to the second reactor are made, all as described above.

Conditions under which the second fluidized bed reactor is operated are approximately as follows:
temperature: 70° C.
pressure: 165 psia (except 240 psia in examples 1 and 5)
fluidizing gas velocity: 1.2 foot per second The Table sets forth the following variables and results:

1. Mole ratio of hydrogen to propylene or to propylene plus ethylene in the first reactor.
2. Mole ratio of ethylene to propylene in the first reactor.
3. Mole ratio of hydrogen to ethylene plus propylene in the second reactor.
4. Mole ratio of ethylene to propylene in the second reactor.

produced in the second reactor. The amount of copolymer is determined by conventional infrared spectrophotometric techniques.

6. Melt flow: ASTM D1238; Condition L at 230° C. and 2.16 kilogram load. The results are given in grams per 10 minutes.

7. Secant Modulus: This is the secant flexural modulus $\times 10^{-5}$. The result is given in psi (pounds per square inch). The test used is ASTM D790, Method A.

8. Notched Izod Impact Strength at 23° C. and 0° C. The result is given in foot-pounds per inch. The test used is ASTM D256.

9. Gardner Impact Strength ($-30°$ C.). The result is given in inch-pound. The test used is ASTM D3029; Condition G.

10. Stress Whitening Resistance at 10 inch pound impact. The result is given in inches (in.). The test is described as follows: average diameter of stress whitened area is measured 24 hours after impact at 10 inch pounds using apparatus described in ASTM D3029, Condition G, with sample support ring removed.

11. Tensile Yield Strength at two inches per minute. The result is given in psi. The test used is ASTM D638; draw rate=2 inches per minute.

12. Tensile Yield Elongation. The result is given in percent. The test used is ASTM D638; draw rate=2 inches per minute.

13. Vicat Softening Point. The result is given in degrees Centigrade (° C.). The test used is ASTM D1525.

14. Rockwell Hardness, R Scale. The test used is ASTM D785.

15. Specular Gloss 60°. The result is given in percent (%). The test used is ASTM D523; measured at a 60° angle using an injection molded specimen.

16. DSC Melting Point (m.p.) for poly ethylene crystalline fraction (PE) and polypropylene crystalline fraction (PP) is given in degrees Centigrade (° C.). The $\Delta H$ (Heat of Fusion) for polyethylene is given in calories per gram (cal/g). The tests used are ASTM 3417 and 3418. The PE value stands for the endotherm peak associated with the melting of the polyethylene crystalline fraction. The PP value stands for the endotherm peak associated with the melting of the polypropylene crystalline fraction. The $\Delta H$ PE represents the energy required to melt the polyethylene crystalline fraction.

TABLE

| EXAMPLE | 1 | 2 | 3 | 4 | 5 |
|---|---|---|---|---|---|
| 1. $H_2/C_3$ or $H_2/C_3 + C_2$ (1st Rx) | 0.053 | 0.036 | 0.050 | 0.059 | 0.04 |
| 2. $C_2/C_3$ (1st Rx) | — | — | — | 0.024 | — |
| 3. $H_2/C_2 + C_3$ (2nd Rx) | 0.27 | 0.11 | 0.38 | 0.17 | 0.17 |
| 4. $C_2/C_3$ (2nd Rx) | 21 | 13 | 12 | 14 | 31 |
| 5. Copolymer Fraction (%) | 27 | 28 | 28 | 23 | 22 |
| 6. Melt Flow (grams/10 min.) | 3.8 | 1.6 | 4.9 | 3.2 | 2.9 |
| 7. Secant Modulus (psi $\times 10^5$) | 1.58 | 1.44 | 1.59 | 1.37 | 1.52 |
| 8. Notched Izod, 23° C. (ft. lb/in.) | 1.0 | 1.6 | 0.9 | 1.1 | 1.1 |
| 0° C. (ft. lb/in.) | 0.5 | 0.8 | 0.4 | 0.7 | 0.6 |
| 9. Gardner Impact Strength (in-lb) | 190 | 180 | 140 | 160 | 150 |
| 10. Stress Whitening Resistance (in.) | <0.1 | <0.1 | <0.1 | <0.1 | <0.1 |
| 11. Tensile Yield Strength (psi) | 4340 | 3990 | 4300 | 4010 | 4240 |
| 12. Tensile Yield Elongation (%) | 8.3 | 9.3 | 8.3 | 10.1 | 9.3 |
| 13. Vicat Softening Point (°C.) | 138 | 135 | 133 | 132 | 135 |
| 14. Rockwell Hardness, R Scale | 88 | 82 | 87 | 79 | 84 |
| 15. Specular Gloss 60° (%) | 39 | 82 | 80 | 46 | 39 |
| 16. DSC m.p., PE (°C.) | 127 | 127 | 126 | 125 | 127 |
| PP (°C.) | 160 | 160 | 160 | 153 | 155 |
| $\Delta H$ PE (cal/g) | 7.2 | 9.2 | 7.2 | 4.7 | 5.2 |

5. Copolymer Fraction. This variable is given in percent (%). It is the percent by weight of ethylene/propylene copolymer based on the weight of total polymer produced, i.e., product. This refers to the copolymer

What is claimed is:

1. A process for the production of a product comprising ethylene/propylene copolymer incorporated into a matrix of propylene homopolymer or copolymer comprising the following steps carried out in the gas phase:
   (a) contacting propylene or propylene and at least one alpha-olefin having 2 to 8 carbon atoms, and hydrogen, wherein the alpha-olefin is present in a ratio of about 0.01 to about 0.06 mole of alpha-olefin per mole of propylene and the hydrogen is present in a ratio of about 0.001 to about 0.45 mole of hydrogen per mole of combined propylene and alpha-olefin, with a catalyst comprising (i) a catalyst precursor, which includes titanium, magnesium, chlorine, and an electron donor; (ii) a hydrocarbylaluminum cocatalyst; and (iii) a selectivity control agent, which is different from the electron donor, in a first reactor in such a manner that a mixture of a homopolymer of propylene or a copolymer of propylene and alpha-olefin together with active catalyst is produced;
   (b) passing the mixture from step (a) into a second reactor; and
   (c) adding to the second reactor:
      (i) a sufficient amount of ethylene and propylene to provide ethylene/propylene copolymer in an amount of about 20 percent to about 45 percent by weight, based on the weight of the product, said ethylene and propylene being introduced in a ratio of about 10 to about 50 moles of ethylene per mole of propylene; and
      (ii) hydrogen in a mole ratio of about 0.1 to about 1.0 mole of hydrogen per mole of combined ethylene and propylene; and
   (d) effecting the copolymerization of ethylene and propylene in the second reactor in such a manner that the product is produced.

2. The process defined in claim 1 wherein alpha-olefin is present in the first reactor in a ratio of about 0.015 to about 0.04 mole of alpha olefin per mole of propylene.

3. The process defined in claim 1 wherein the hydrogen is present in the first reactor in a ratio of about 0.004 to about 0.1 mole of hydrogen per mole of combined propylene and alpha-olefin.

4. The process defined in claim 2 wherein the alpha-olefin is ethylene.

5. The process defined in claim 1 wherein a sufficient amount of ethylene and propylene is added to the second reactor to provide ethylene/propylene copolymer in an amount of about 25 to about 30 percent by weight.

6. The process defined in claim 1 wherein the hydrogen is introduced into the second reactor in a mole ratio of about 0.1 to about 0.4 mole of hydrogen per mole of ethylene and propylene.

7. The process defined in claim 1 wherein the electron donor and the selectivity control agent are selected from the group consisting of ethers, mono- or polycarboxylic acid esters, ketones, phenols, amines, amides, imines, nitriles, silanes, phosphines, phosphates, stilbenes, arsines, phosphoramides, and alcoholates.

8. The process defined in claim 1 wherein the electron donor is ethyl benzoate and the selectivity control agent is para-ethoxy ethyl benzoate.

9. The process defined in claim 1 wherein the electron donor is a polycarboxylic acid ester containing two coplanar ester groups attached to adjacent carbon atoms and the selectivity control agent is a silicon compound containing a silicon-oxygen-carbon linkage.

10. The process defined in claim 9 wherein the atomic ratio of aluminum in the cocatalyst to silicon in the silicon compound is in the range of about 0.5:1 to about 100:1 and the atomic ratio of said aluminum to the titanium in the catalyst precursor is in the range of about 5:1 to about 300:1.

11. The product produced by the process defined in claim 1.

12. The product produced by the process defined in claim 9.

* * * * *